United States Patent
Kurashima

(10) Patent No.: US 7,108,429 B2
(45) Date of Patent: Sep. 19, 2006

(54) RELEASING MECHANISM OF AN OPTICAL MODULE FROM A HOST BOARD

(75) Inventor: Hiromi Kurashima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/174,559

(22) Filed: Jul. 6, 2005

(65) Prior Publication Data

US 2005/0244127 A1 Nov. 3, 2005

Related U.S. Application Data

(63) Continuation-in-part of application No. 10/342,317, filed on Jan. 15, 2003, now Pat. No. 6,922,516.

(30) Foreign Application Priority Data

| Jan. 15, 2002 | (JP) | ............... P2002-006242 |
| Jun. 21, 2002 | (JP) | ............... P2002-182091 |
| Aug. 8, 2002 | (JP) | ............... P2002-231919 |

(51) Int. Cl.
*G02B 6/36* (2006.01)

(52) U.S. Cl. ...................................... 385/53
(58) Field of Classification Search .................. 385/53, 385/70, 77, 88, 89, 92, 134, 136
See application file for complete search history.

(56) References Cited

U.S. PATENT DOCUMENTS

| 6,304,436 | B1 | 10/2001 | Branch et al. |
| 6,335,869 | B1 | 1/2002 | Branch et al. |
| 6,692,159 | B1 | 2/2004 | Chiu et al. |
| 6,830,385 | B1 * | 12/2004 | Ishigami et al. ............ 385/92 |
| 2002/0150353 | A1 | 10/2002 | Chiu et al. |
| 2003/0133665 | A1 | 7/2003 | Chiu et al. |
| 2004/0062493 | A1 * | 4/2004 | Ishigami et al. ............ 385/92 |

FOREIGN PATENT DOCUMENTS

| JP | 62-170902 | 10/1987 |
| JP | 3-8489 | 1/1991 |

OTHER PUBLICATIONS

Proceedings of the 2001 IEICE general conference (The Institute of Electronics, Information and Communication Engineers), Mar. 26-29, 2001 (w/ English Translation).

\* cited by examiner

*Primary Examiner*—Chandrika Prasad
(74) *Attorney, Agent, or Firm*—McDermott Will & Emery LLP

(57) ABSTRACT

The present invention provides An optical module to be put into a host board, comprising: a module body to be installed on the host board; a projection provided on the module body and adapted to engage with a hook provided in the host board; and a lever mounted on the module body in order to disengage the hook engaging with the projection, to release engagement therebetween, wherein said lever comprises: a first portion which moves when a force is applied thereon in a direction toward the module body; and a second portion for pushing up said hook, said second portion having a tip portion and being interconnected to the first portion, wherein the second portion of the lever is bent toward a direction apart from the module body at a center thereof and bent toward a direction close to the module body at thed tip portion thereof.

5 Claims, 14 Drawing Sheets

RELEASING MECHANISM OF AN OPTICAL MODULE FROM A HOST BOARD

CROSS REFERENCE TO RELATED APPLICATION

This application is a continuation-in-part of U.S. patent application Ser. No. 10/342,317, filed on Jan. 15, 2003 now U.S. Pat. No. 6,922,516, which claims the benefit of Japanese Patent Application No. 2002-006242, filed on Jan. 15, 2002, Japanese Patent Application No. 2002-182091, filed on Jun. 21, 2002 and Japanese Patent Application No. 2002-231919, filed on Aug. 8, 2002, the relevance of which is incorporated by reference.

BACKGROUND OF THE INVENTION

1. Field of the Invention

The present invention relates to a hot-plug type optical module.

2. Related Background Art

An optical module of the pluggable type, which is used in such a manner that the optical module loading with a light emitting unit and/or a light receiving unit is installed in a host board, was known in the prior art. This optical module is generally fixed to the host board, as shown in FIG. 17A and FIG. 17B, through engagement between a hook 41 provided in the host board and a projection 15 provided in a housing 14 of the optical module. The optical module thus fixed is dismounted in the following manner from the host board. In the first step, as shown in FIGS. 17A and 17B, a wedge-shaped projection 50 is slid along a direction of an arrow to be pushed against the hook 41. This results in lifting the hook 41 up along a slant surface of the projection 50, whereby the hook 41 is disengaged from the projection 15. While the hook 41 is kept in a dismounted state, the optical module is then drawn out of the host board.

However, the mechanism for dismounting the optical module, described above, had the problem of poor workability. Namely, in order to disengage the hook 41, the projection 50 had to be slid to in the pushing direction of the optical module on the occasion of pulling the optical module out of the host board, which was an inefficient work. Particularly, optical modules are mounted in an integrated form on the host board in many cases, and work space is limited. It was thus difficult to draw the optical module while pushing the projection 50 toward the hook 41.

SUMMARY OF THE INVENTION

One object of the present invention is to provide an optical module to be readily disengaged with the host board.

According to one aspect of the present invention, an optical module is provided, which is put on a host board. The optical module includes a module body, a projection and a lever. The module body is installed on the host board. The projection is provided on the module body in order to engage with a hook that is provided in the host board. The lever, which is mounted on the module body to disengage the hook, may include a first portion and a second portion. The first portion approaches the module body when a force is applied to the first portion in a direction toward the module body. The second portion, which has a tip portion and is interconnected to the first portion, pushes up the hook. The second portion, according to the present invention, is bent toward a direction apart from the module body a center of the second portion and bent again toward a direction close to the module body at the tip portion thereof.

The lever may include a curled portion that connects the first portion to the second portion. The curled portion applies a restoring force to the second portion against the first portion.

According to another aspect of the present invention, an optical module that is to be put on a host board and includes a module body, a projection and a lever is provided. The module body is to be installed on the host board. The projection is provided on the module body in order to engage with a hook provided in the host board. The lever, which is mounted on the module body to disengage the hook, may include a first portion and a second portion. The first portion approaches the module body when a force is applied thereto in a direction toward the module body. The second portion, which has a tip portion and is interconnected to the first portion, pushes up the hook. The tip portion, according to the present aspect, has a chamfered edge in a side opposite to the module body.

DESCRIPTION OF THE PREFERRED EMBODIMENTS

The preferred embodiments of the optical module according to the present invention will be described below in detail with reference to the drawings. The same reference symbols will denote the same elements throughout the description of the drawings and redundant description will be omitted.

Figure 1:
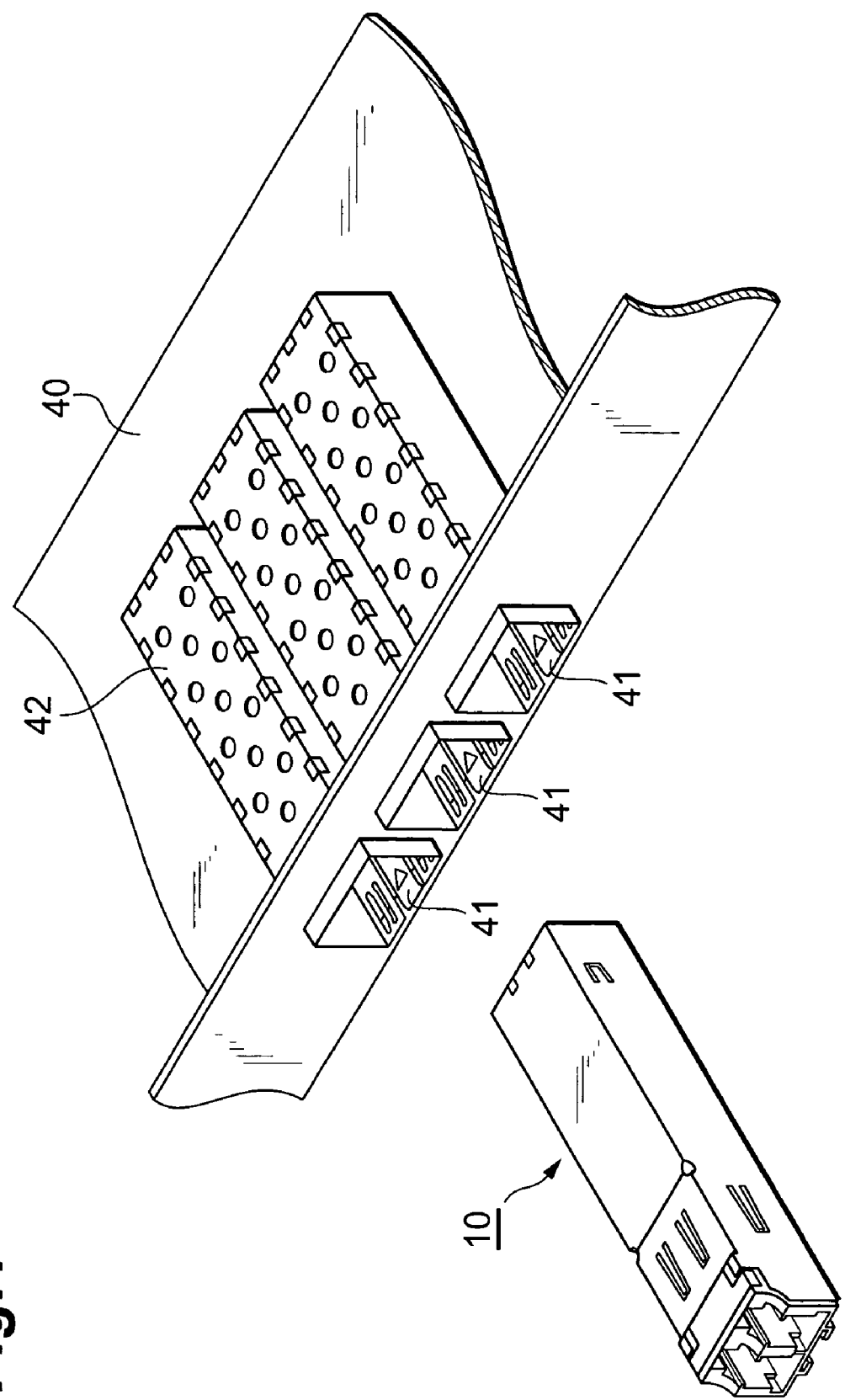
FIG. 1 is a perspective view showing an optical module according to an embodiment and a host board to receive the optical module.
Figure 2:
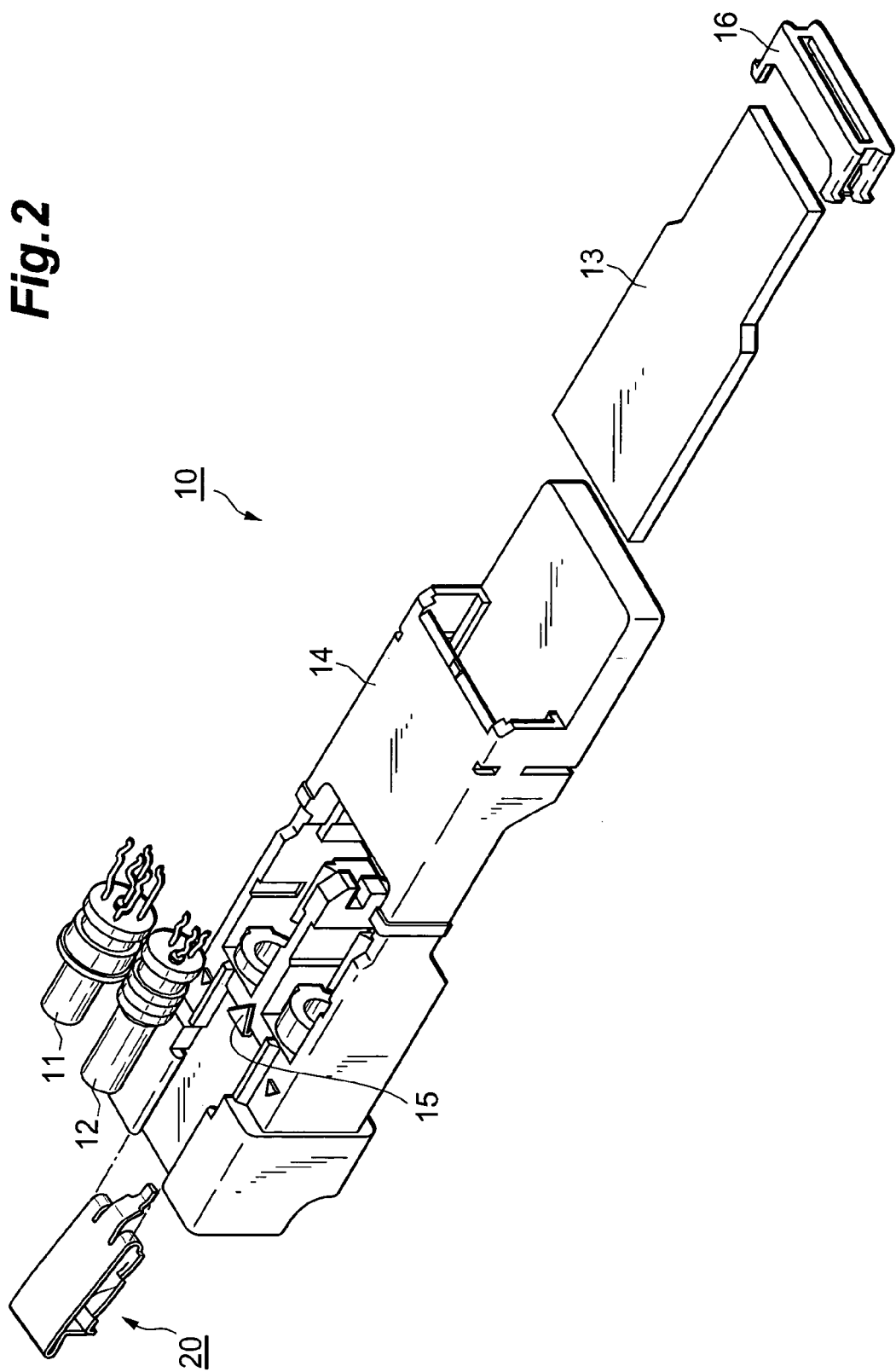
FIG. 2 is an exploded perspective view of an optical module.

FIG. 1 is a perspective view showing the optical module 10 according to an embodiment and the host board 40 into which the optical module 10 is to be installed, and FIG. 2 an exploded perspective view of the optical module 10. As shown in FIG. 1, the optical module 10 is inserted into a cage 42 provided in the host board 40. A projection (blocked from view in FIG. 1) formed in the housing 14 of the optical module 10 then goes into engagement with the hook 41 provided in the host board 40, whereby the optical module 10 is fixed to the host board 40. The manner of the engagement between the projection and the hook 41 is the same as the manner of the engagement shown in FIGS. 28A and 28B.

The optical module 10 according to the embodiment will be described below. FIG. 2 is a view of the optical module 10 from an obliquely lower direction in FIG. 1. As shown in FIG. 2, the optical module 10 has a light emitting unit 12, a light receiving unit 11, a circuit board 13 loaded with circuits for operating the light emitting unit 12 and the light receiving unit 11 (which will be referred to together as "optical unit"), and a housing 14 for housing the optical unit and the circuit board 13. The circuit board 13 housed in the housing 14 is supported by a board support 16. The projection 15 to engage with the hook 41 is formed in the housing 14, and a lever 20 is mounted near the projection 15. Although the present example describes the optical transceiver module having the light emitting unit 12 and light receiving unit 11, the module can be a light emitting module having a light emitting unit or a plurality of light emitting units, or a light receiving module having a light receiving unit or a plurality of light receiving units. The number of light emitting unit 12 and light receiving unit 11 in the optical module 10 is not limited to two, but may be four or more.

Figure 3:
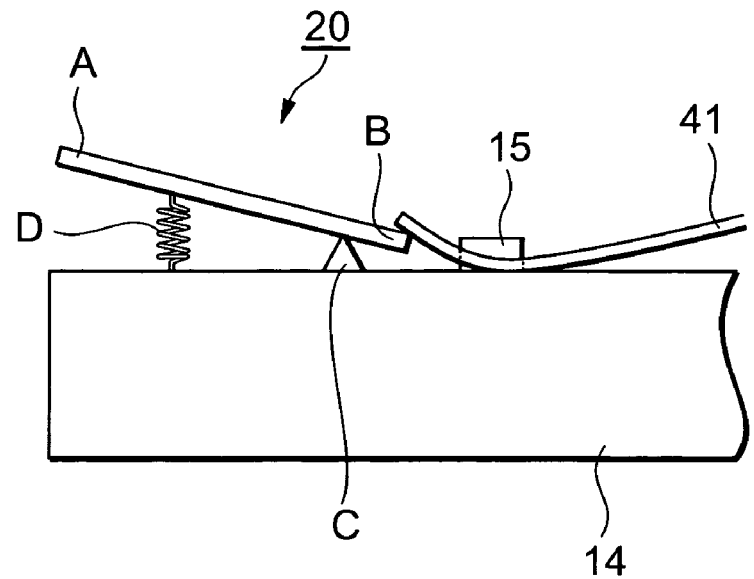
FIG. 3 is a diagram for explaining the principle of releasing the engagement by the lever.

The lever 20 for disengaging the hook 41 from the projection 15 will be described below. The mechanism of releasing the engagement between the projection 15 and the hook 41 by the lever 20 will be first described with reference to FIG. 3. FIG. 3 is a diagram for explaining this mechanism, from which the elements other than the elements necessary for the description are omitted. When the optical module 10 is fixed to the host board 40, as shown in FIG. 3, the hook 41 of the host board 40 engages with the projection 15 formed in the housing. The lever 20 makes use of the mechanism of lever action in order to lift the hook 41 up, and has a fulcrum C, a power point A where a force is affected, and a point of application B for lifting the hook 41 up. As the power point A moves toward the housing 14 with the force on the power point A, the point of application B moves in a leaving direction from the housing 14 with the movement of the power point A, so as to lift the hook 41 up. Without any force on the power point A, the restoring device D keeps the point of application B of the lever 20 located nearer to the housing 14 than the top portion of the projection 15, so that the lever 20 can be prevented from obstructing the engagement between the projection 15 and the hook 41 in setting the optical module 10 into the host board 40. The above describes the mechanism of the lever 20 for releasing the engagement in the present invention.

Figure 4:
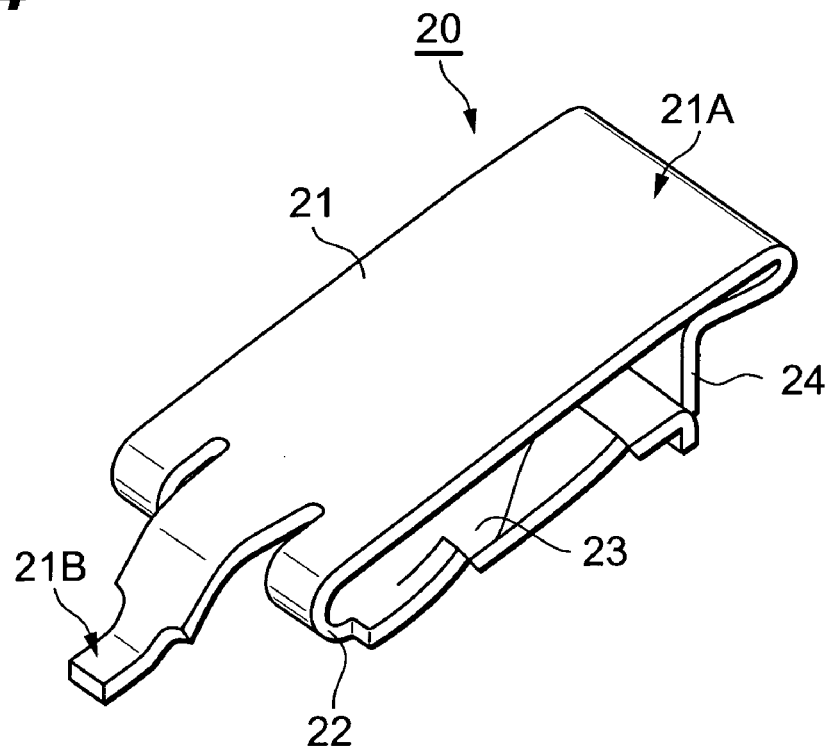
FIG. 4 is a perspective view showing the lever according to the first embodiment.
Figure 5:
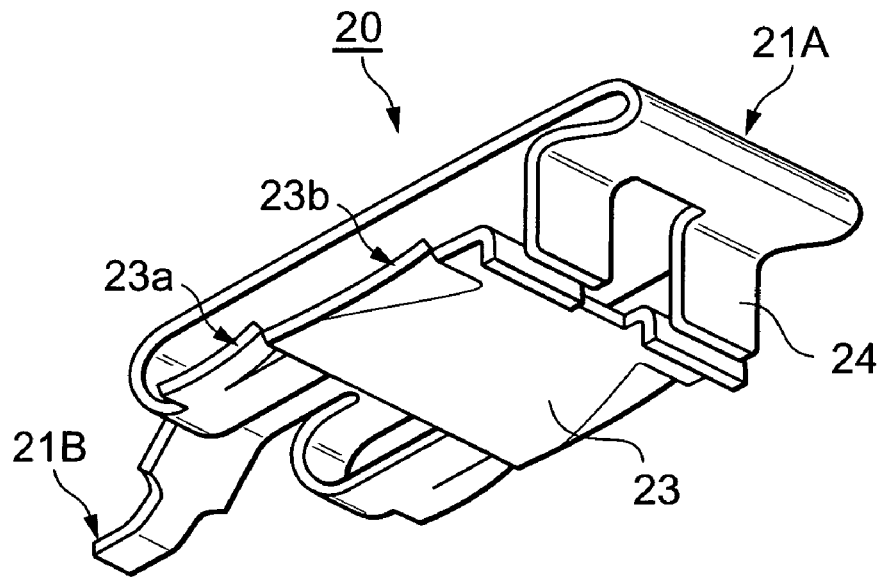
FIG. 5 is a perspective view showing the lever according to the first embodiment.
Figure 6:
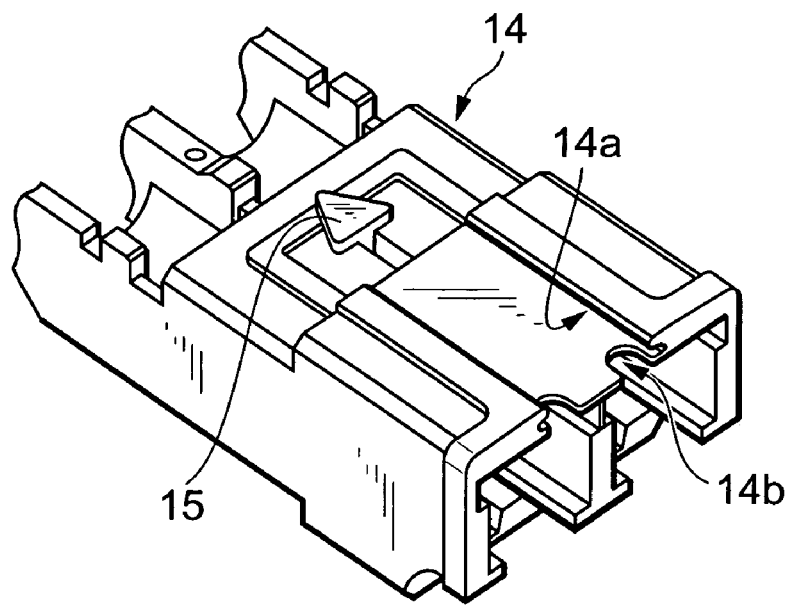
FIG. 6 is a perspective view showing part of the housing according to the first embodiment.
Figure 7:
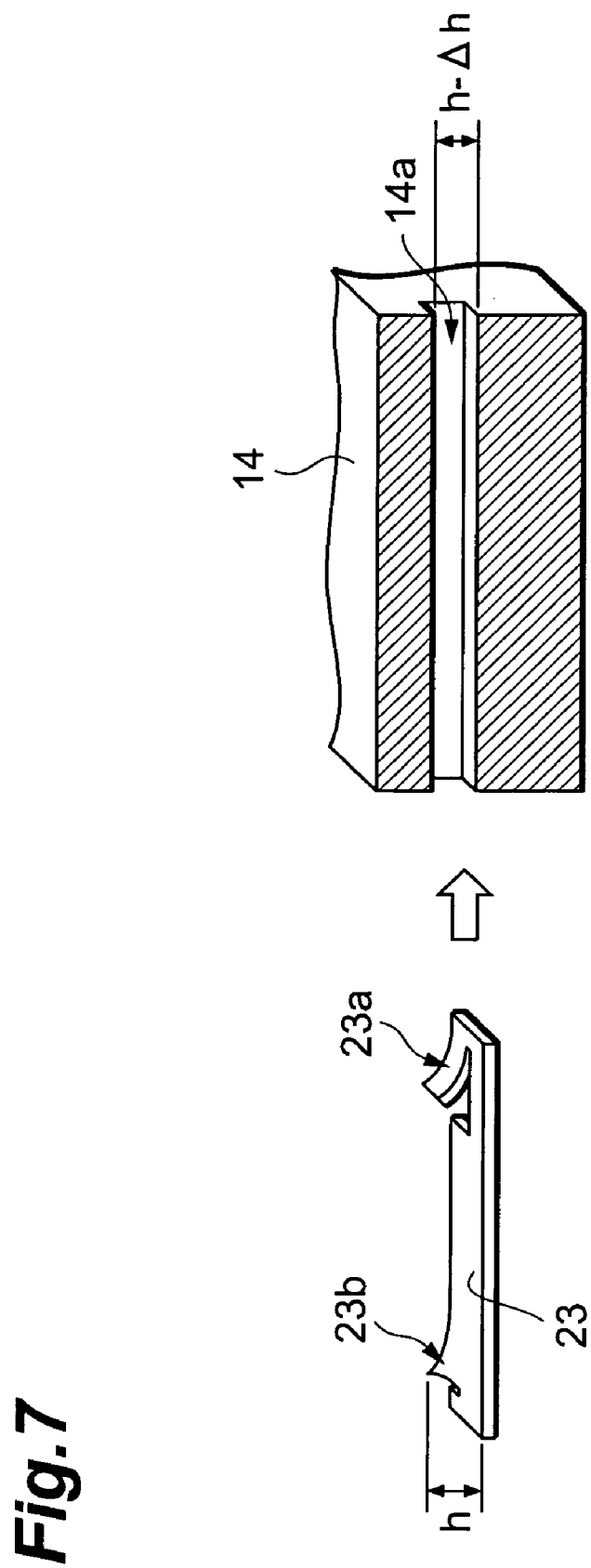
FIG. 7 is a diagram showing the principle of mounting the lever according to the first embodiment.

The lever 20 according to the embodiment will be described below. FIG. 4 is a perspective view showing the lever 20 according to the first embodiment. The lever 20 includes a platelike part 21, which has a first portion 21A as a power point and a second portion 21B as a point of application at its both ends, and a mounting part 23, which is formed by bending the platelike part 21. The lever 20 is made of metal with excellent mechanical properties, and the platelike part 21 and mounting part 23 are integrally formed. A curled part 22, which connects the mounting part 23 to the platelike part 21, functions as a fulcrum. FIG. 5 is a perspective view of the lever 20 from the side of optical module 10, in which each side of the mounting part 23 is bent at two positions to form bent portions 23a, 23b and in which the amount of the bend increases from the curled part 22 toward the free end. The bent portions 23a, 23b have a function of fixing the mounting part 23 to the housing 14. Grooves 14a for mounting of the lever 20 are formed in a portion of the housing 14 to which the lever 20 is mounted, as shown in FIG. 6. Supposing the maximum of the height of the bent portions 23a, 23b is h, the width of the grooves 14a is designed to a value (h−Δh) a little smaller than h. Notches 14b formed at an edge of the housing 14 are intended for allowing error-preventing pawls 24 to enter an optical connector receiving area. The fixing of the mounting part 23 into the grooves 14a will be described below with reference to FIG. 7. FIG. 7 is a diagram showing the relation between the bent portions 23a, 23b of the mounting part 23 and the grooves 14a. Inserting the mounting part 23 into the grooves 14a, the mounting part is inserted from the smaller bend amount side and thus the mounting part 23 smoothly moves into the grooves 14a. Once the mounting part 23 is inserted into the grooves 14a, the bent portions 23a, 23b will catch in the grooves if one tries to move the mounting part 23 backward (in the dismounting direction). The mounting part is efficiently fitted into the grooves 14a in this way, whereby the lever 20 is fixed to the housing 14.

Figure 8:
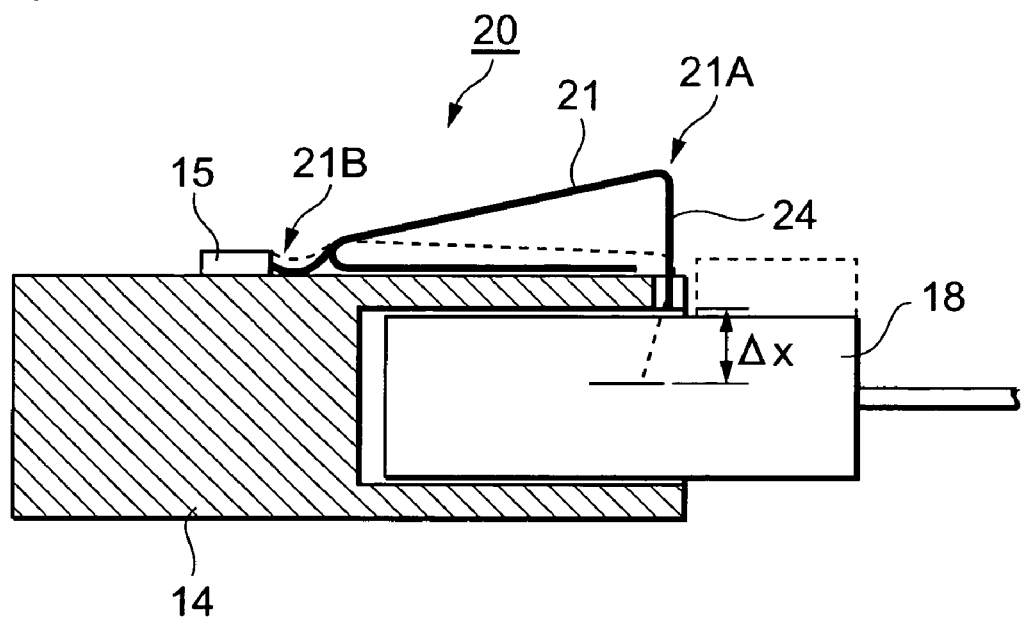
FIG. 8 is a diagram to explain the role of error-preventing pawls.

Referring again to FIG. 5, the first portion 21A is provided with the error-preventing pawls 24 extending toward the mounting part 23. The error-preventing pawls 24 have a function of preventing the optical module 10 from being dismounted from the host board 40 during an optical connector being inserted therein. The function of the error-preventing pawls 24 will be described with reference to FIG. 8. FIG. 8 is a view of the housing 14 and the lever 20 mounted on the housing 14 from the side of the optical module 10. The elements other than those necessary for the description of the function of the error-preventing pawls 24 are omitted from FIG. 8. The housing 14 is cut away on the fixing side of the lever 20 (cf. FIG. 6), so as to communicate with the connector-receiving area. The error-preventing pawls 24 are allowed to go into the connector-receiving area through the notches 14b. In FIG. 8, a dashed line indicates the position of the lever 20 with a force on the first portion 21A when the optical connector is not received. When the force is applied on the first portion 21A in the state when the optical connector 18 is not received, the first portion 21A moves toward the housing 14, as indicated by the dashed line in FIG. 8, and with this movement the second portion 21B moves in the leaving direction to disengage the hook 41 from the projection 15. When the optical connector 18 is received in the connector-receiving area, however, the error-preventing pawls 24 go into contact with the optical connector with the movement of the first portion 21A toward the housing 14, as shown in FIG. 8, so that the movement of the first portion 21A is restricted at the point of the contact between the error-preventing pawls 24 and the optical connector. This also results in restricting the movement of the second portion 21B, whereby the hook 41 is incapable of being disengaged from the projection 15. The length of the error-preventing pawls 24 can be set to a length enough to restrict the movement of the first portion 21A so as to prevent the second portion 21B from disengaging the hook 41. More specifically, supposing the hook 41 is disengaged when the lever 20 is located at the position indicated by the dashed line in FIG. 8 with the movement of the first portion 21A by Δx, the length of the error-preventing pawls 24 is determined so that the amount of displacement of the first portion 21A becomes smaller than Δx.

The function of the optical module 10 according to the first embodiment will be described below. The optical module 10 according to the first embodiment is provided with the lever 20 having the first portion 21A and the second portion 21B. The optical module 10 is configured so that the second portion 15 moves away from the housing 14 with movement of the first portion 21A toward the housing 14. Therefore, for pulling the optical module 10 out the host board 40, the user pinches the first portion 21A of the lever 20 whereupon the hook 41 engaging with the projection 15 is disengaged by the second portion 21B, to whereby the optical module 10 is smoothly dismounted from the host board 40.

Since the first portion 21A of the lever 20 is provided with the error-preventing pawls 24 extending to the area for reception of the optical connector 18, the motion of the lever 20 is restricted when the optical connector 18 is inserted in the optical module 10. This prevents the hook 41 from being accidentally disengaged from the projection 15 during the operation of the optical module 10. Since the mechanism of dismounting the optical module 10 of the conventional slide type actuator with no means for restricting the longitudinal motion, the optical module 10 was accidentally dismounted during the operation of the optical module 10. The optical module 10 according to the embodiment also has permitted control in this respect.

Figure 9:
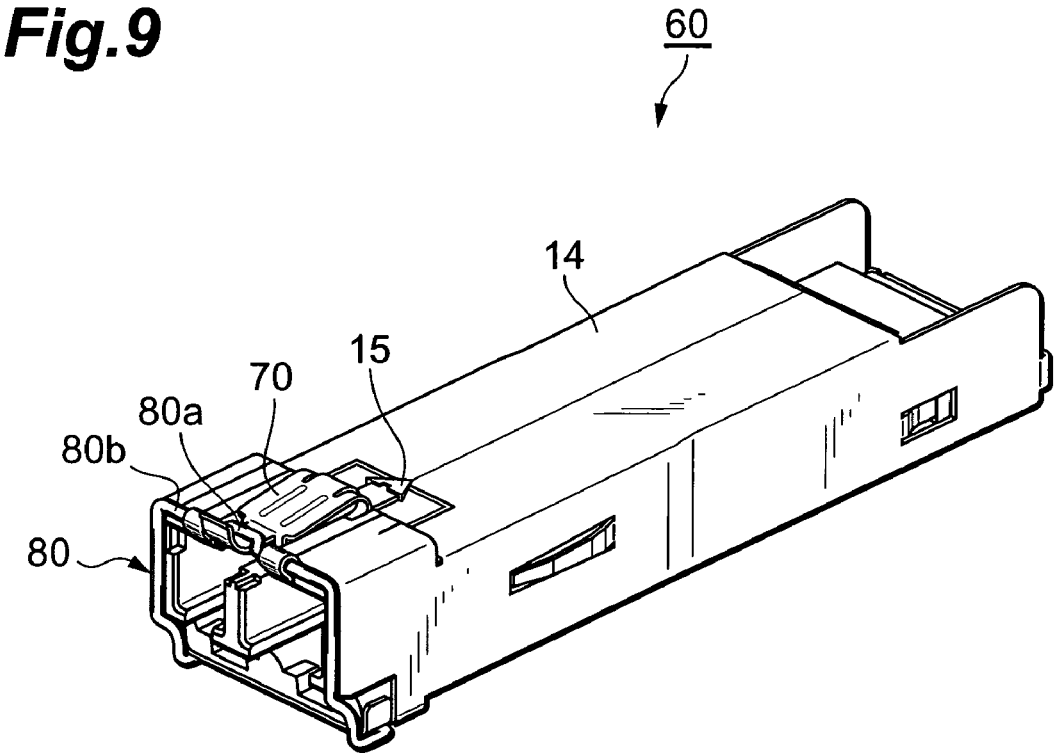
FIG. 9 is a perspective view showing the optical module according to the second embodiment.

The optical module 60 according to the second embodiment of the present invention will be described next. FIG. 9 is a perspective view of the optical module 60 according to the second embodiment, viewed from the lever mounting surface side. As shown in FIG. 12, the optical module 60 according to the second embodiment has the projection 15 formed in the module body, the lever 70 mounted adjacent to the projection 15, and an actuating member 80 to move the first portion 71A of the lever 70 toward the module body.

The projection 15 has a function of engaging with the hook provided on the host board.

Figure 10:
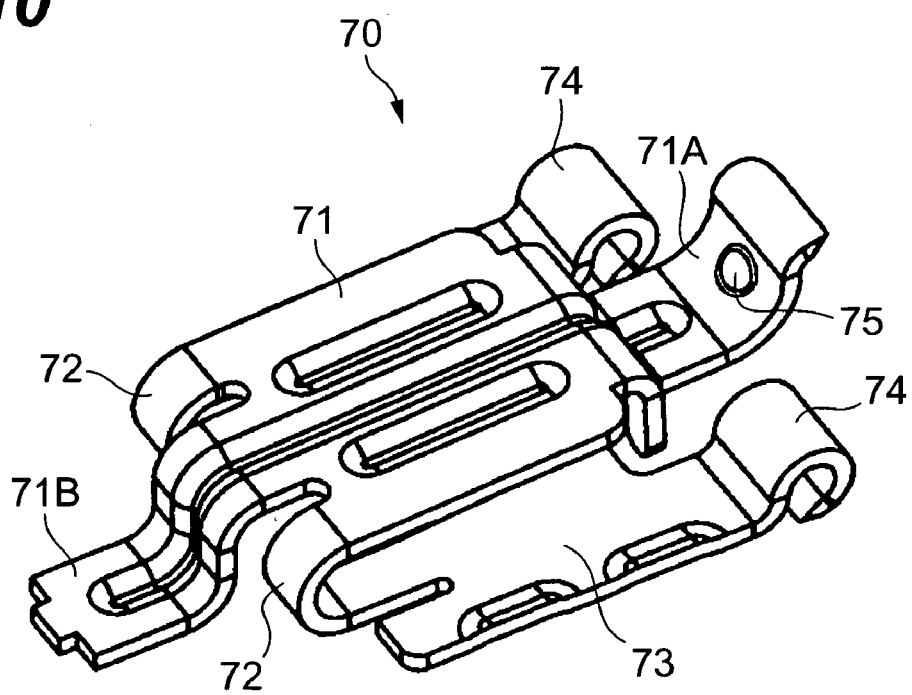
FIG. 10 is a perspective view showing the lever according to the second embodiment.

FIG. 10 is a perspective view showing the lever 70. The lever 70 includes the platelike part 71 having the first portion 71A as a power point and the second portion 71B as a point of application, and the mounting part 73 formed by bending part of the platelike part 71. The lever 70 is made of metal with excellent mechanical properties, and the platelike part 71 and mounting part 73 are formed integrally. The curled part 72, which connects the mounting part 73 to the platelike part 71, serves as a fulcrum. The mounting part 73 is bent at two positions to form actuator-supporting parts 74 rotatably supporting an axis part 80b of the actuating member 80. The first portion 71A extends nearly in parallel with the mounting part 73 and the distal end thereof is rounded in the direction away from the mounting part 73. The first portion 71A is formed so as to be located nearer to the mounting part 73 than the axis part 80b which will be set through the actuator-supporting parts 74.

The actuating member 80, as shown in FIG. 9, is an annular shaped member surrounding an optical connector insertion slot and having the shape almost along the edge of the end face of the optical module 60. A portion of the actuating member 80 along the edge of the lever mounting surface constitutes the axis part 80b. A grip part 80c is formed in a portion of the actuating member 80 along the edge of the surface opposed to the lever mounting surface. A sliding contact part 80a projecting in the insertion direction of the optical connector is formed near the central region of the axis part 80b. The actuating member 80 is rotatably mounted on the lever 70 while the axis part 80b thereof is set through the actuator-supporting parts 74 of the mounting part 73. The axis part 80b is supported at two positions on the both sides of the sliding contact part 80a by the actuator-supporting parts 74 of the lever 70. The actuating member 80 is mounted on the lever 70 in the present embodiment, whereas the actuating member 80 may be mounted on the module body.

Figure 11A:
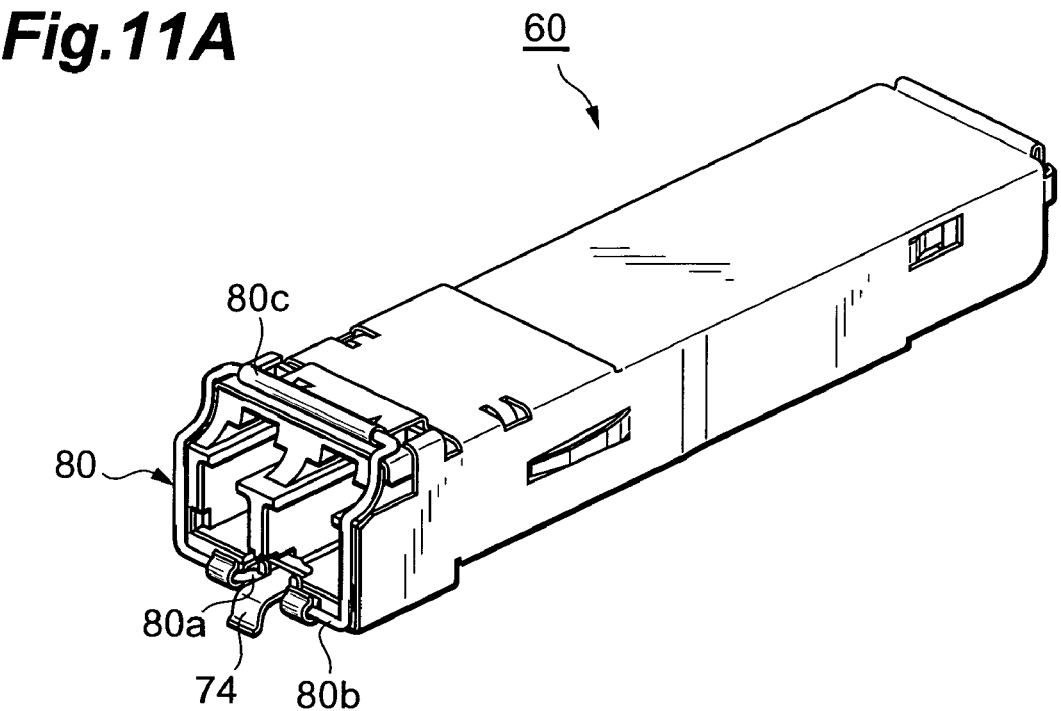
FIG. 11A is a diagram showing the manner of rotation of the actuating member.
Figure 11B:
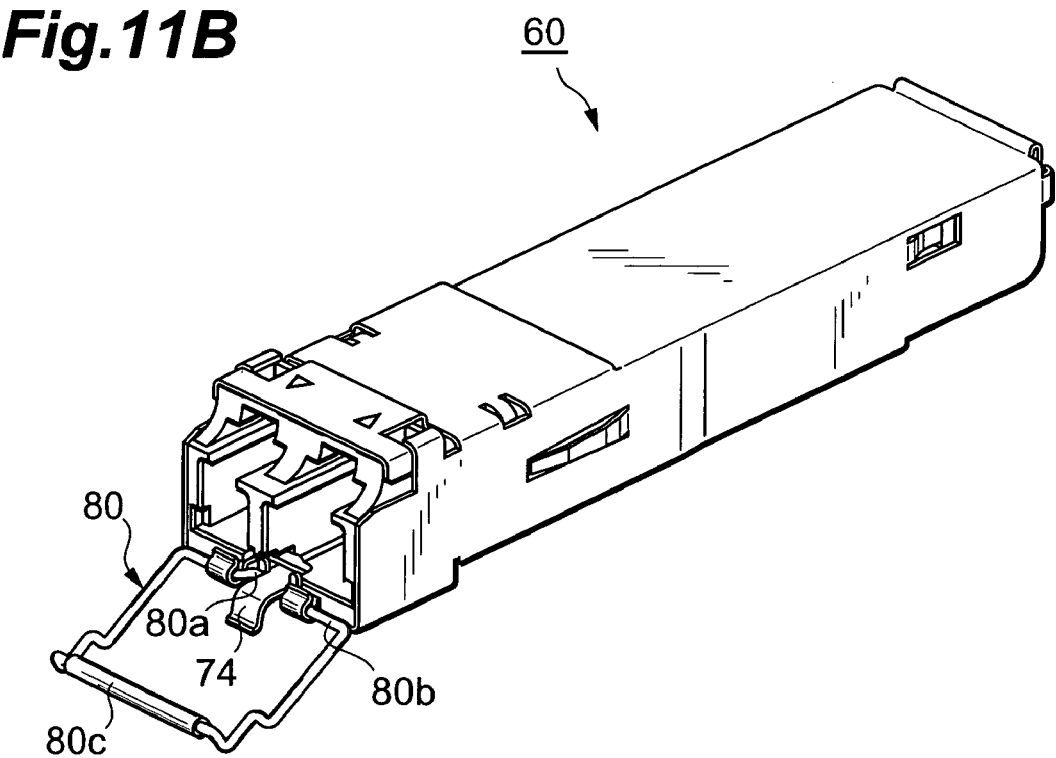
FIG. 11B is a diagram showing the manner of rotation of the actuating member.

The rotation of the actuating member 80 will be described below with reference to FIGS. 11A and 11B. FIG. 11A and FIG. 11B are perspective views of the optical module 60 viewed from the side of the surface opposite to the lever mounting surface. For inserting the optical connector, as shown in FIG. 11A, the actuating member 80 is set to adjoin the optical connector insertion slot so as to clear the space in front of the optical connector insertion slot. For dismounting the optical module 60 from the host board, the actuating member 80 is rotated to locate the grip part 80c on the same plane as the lever mounting surface, as shown in FIG. 11B. In the description hereinafter, the position of the actuating member 80 shown in FIG. 11A will be referred to as "first position," and the position of the actuating member 80 shown in FIG. 11B as "second position."

Figure 12A:
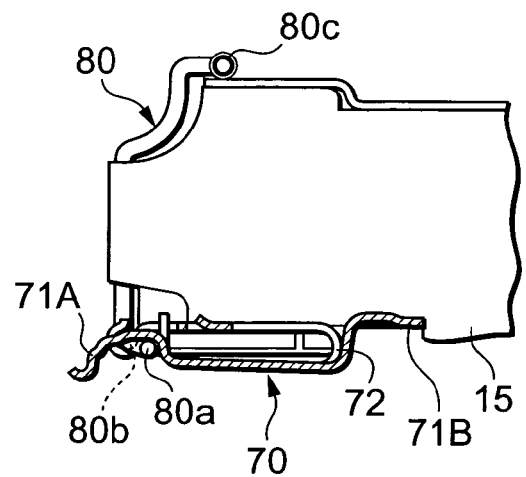
FIG. 12A is a diagram to explain the mechanism of pivotally moving the lever by the actuating member.
Figure 12B:
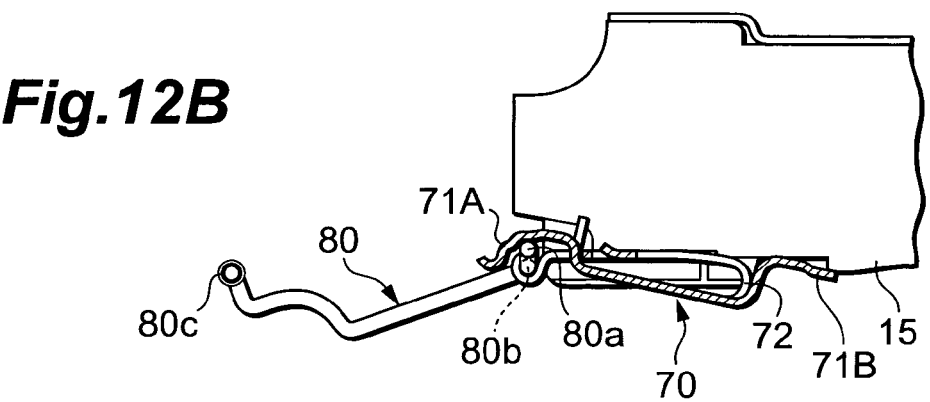
FIG. 12B is a diagram to explain the mechanism of pivotally moving the lever by the actuating member.
Figure 12C:
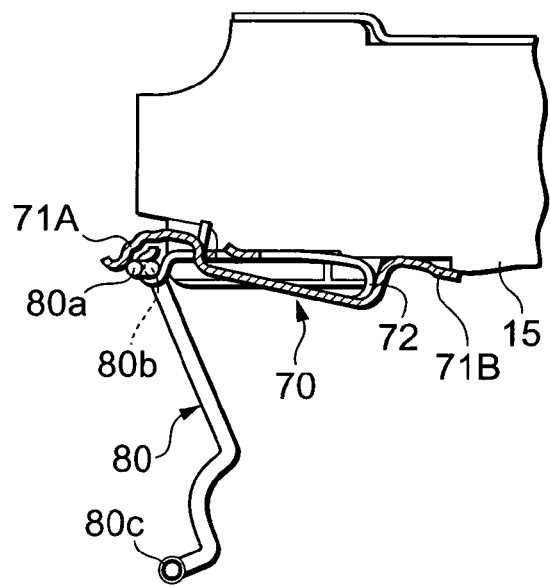
FIG. 12C is a diagram to explain the mechanism of pivotally moving the lever by the actuating member.
Figure 13:
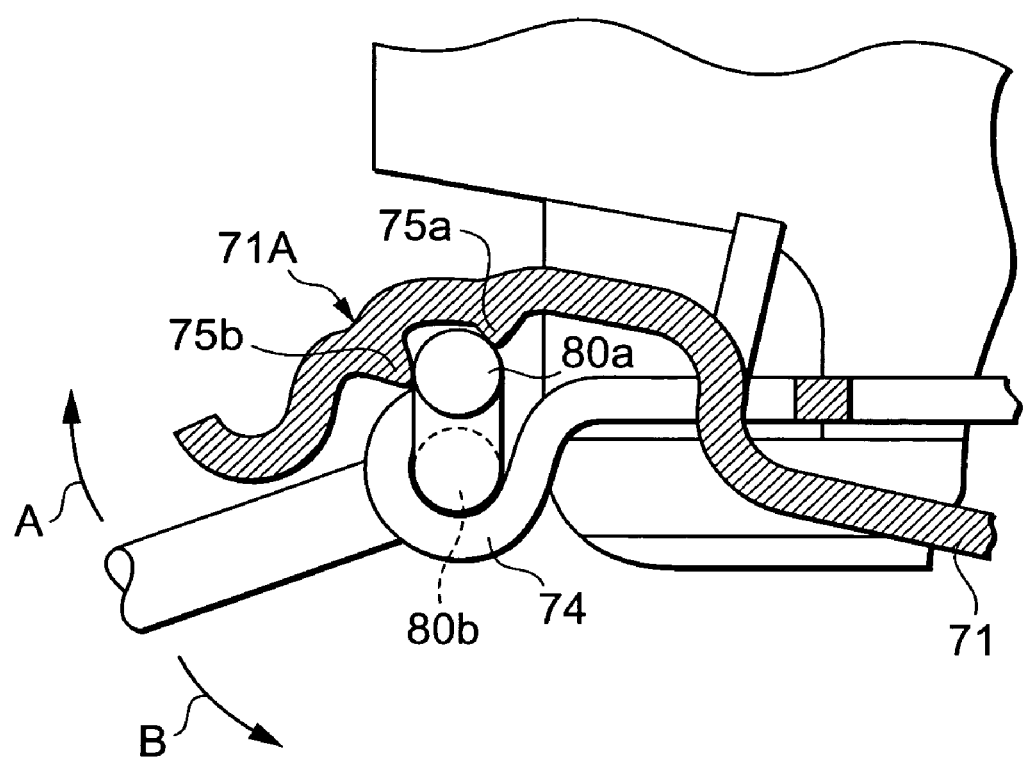
FIG. 13 is a diagram to explain the projections formed in the first portion of the lever.

Subsequently, the operation of the actuating member 80 and lever 70 will be described with reference to FIGS. 12A and 12B. With the lever at the first position, as shown in FIG. 12A, the lever 70 is located by the restoring force of the curled part 72 so that the second portion 71B is lower than the top portion of the projection 15 (on the module body side), and the hook not shown is in engagement with the projection 15. The grip part 80c of the actuating member 80 is then moved away from the optical connector insertion slot to rotate the actuating member 80, whereupon the sliding contact part 80a of the actuating member 80 rotates about the axis part 80b (counterclockwise in the figure) with the rotation of the actuating member. This motion rotationally moves the sliding contact part 80a toward the module body (upward in FIG. 12B) and the sliding contact part 80a slides on the first portion 71A of the lever 70, so as to push the first portion 71A toward the module body. This pivotally moves the lever 70 about the curled part 72, so that the second portion 71B of the lever 70 moves upward, as shown in FIG. 12B. Then the second portion 71B pushes up the hook (not shown) engaging with the projection 15, to disengage the hook from the projection 15. FIG. 13 is a partly enlarged view showing an enlarged contact state between the sliding contact part 80*a* and the first portion 71A. As shown in FIG. 16, with the actuating member 80 at the second position, the sliding contact part 80*a* of the actuating member 80 engages with a projection 75*a* formed in the first portion 71A, so as to restrict the rotation of the actuating member 80 in the direction of arrow A in FIG. 13. This prevents the actuating member 80 from returning to the first position because of the restoring force of the lever 70. When a force over a prescribed level is applied on the grip part 80*c*, the sliding contact part 80*a* climbs over the projection 75*a*, so that the actuating member 80 can be returned to the first position. The sliding contact part 80*a* of the actuating member also engages with a projection 75*b* formed in the first portion 71A, so as to restrict rotation of the actuating member 80 in the direction of arrow B in FIG. 13. This restricts the rotation of the actuating member 80 with the grip part 80*c* at the second position on the same plane as the lever mounting surface. This makes the user conscious that the optical module can be drawn by pulling the grip part 80*c* at the second position. Furthermore, the sliding contact part 80*a* can climb over the projection 75*b*, so that the actuating member 80 can be rotated in the direction opposite to the first position, as shown in FIG. 15C. This mechanism can prevent the failure such as detachment of the actuating member 80 with application of a downward force on the grip part 80*c* at the position of FIG. 12B. The first portion 71A in slide contact with the sliding contact part 80*a* is so curved that the second portion 71B can be maintained at the position of the top portion of the projection 15 during the rotation of the actuating member 80 up to the state shown in FIG. 12C.

Figure 14A:
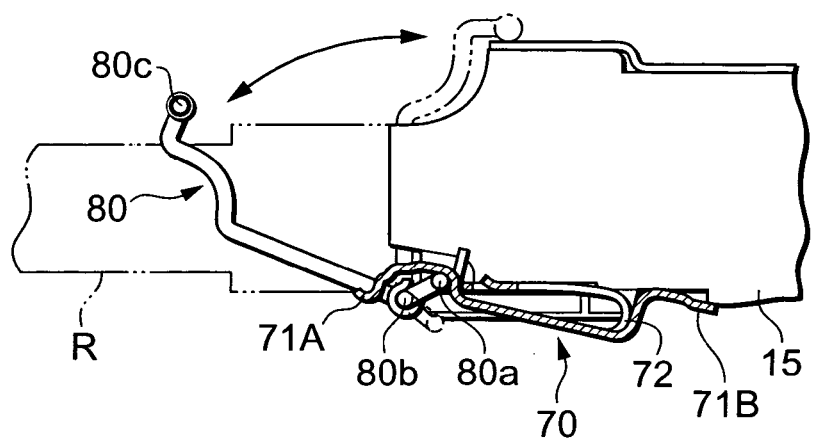
FIG. 14A is a diagram to explain the angle of rotation of the actuating member on the occasion of releasing the engagement between the projection and the hook.
Figure 14B:
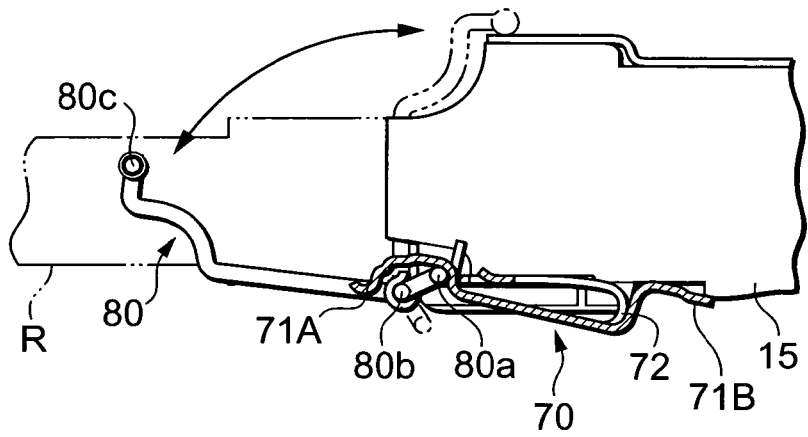
FIG. 14B is a diagram to explain the angle of rotation of the actuating member on the occasion of releasing the engagement between the projection and the hook.

The following will describe the angle of rotation of the actuating member 80 during the disengagement of the hook 41 from the projection 15. FIG. 14A and FIG. 14B are diagrams showing positions of the actuating member 80 during the disengagement of the hook 41 from the projection 15.

The actuating member 80 rotates away from the optical connector insertion slot from the state in which the grip part 80*c* is adjacent to the optical connector insertion slot, as described above. In the example shown in FIG. 14A, before the grip part 80*c* reaches an area R occupied by the optical connector to be inserted, the second portion 71B moves up to the top portion of the projection 15, so as to release the engagement between the projection 15 and the hook 41. The angle of rotation of the actuating member 80 with the grip part 80*c* arriving at the area R can be calculated from the height of the end face of the optical module 60, the height of the optical connector, and so on. The amount of rotation is 68° in the case of standard optical modules. Therefore, the optical module is designed so that the engagement between the hook 41 and the projection 15 is released at the rotation angle of not more than 68°. In the example shown in FIG. 14B, when the grip part 80*c* moves into the area R or when it is rotated over the area R, the second portion 71B moves up to the top portion of the projection 15 to release the engagement between the projection 15 and the hook 41. In this case, the optical module is designed so that the engagement between the hook 41 and the projection 15 is released at the rotation angle of greater than 68°. In the optical module 60 according to the present embodiment, the rotation angle of the actuating member 80 upon the disengagement can be designed as shown in each of FIGS. 14A and 14B. The rotation angle of the actuating member 80 can be changed, for example, by a method of changing the angle of the sliding contact part 80*a* relative to the position of the grip part 80*c*, by a method of changing the degree of curvature of the first portion 71A on which the sliding contact part 80*a* slides, etc., as shown in FIGS. 14A and 14B.

The example of releasing the engagement before the grip part 80*c* arrives at the area R (cf. FIG. 14A) has the advantage that the hook 41 engaging with the projection 15 can be disengaged in the state in which the optical connector is inserted in the optical module 60. Normally, an optical connector, when dismounted from the optical module 60, needs to be cleaned before inserted again, but using of this arrangement permits the optical module 60 to be dismounted from the host board 40 when the optical connector is inserted in the optical module 60. In this arrangement that the hook 41 is disengaged in the inserted state of the optical connector, the lever is not provided with the pawls 24 for restricting the movement of the first portion 21A, which were described in the first and the second embodiment. In the example that the engagement is released when the grip part 80*c* moves into the connector occupying area R (cf. FIG. 14B) or rotates over the connector occupying area R, the grip part 80*c* goes into contact with the inserted optical connector when the optical connector is inserted in the optical module 60, so that the optical module 60 cannot be drawn out of the host board 40 in the connector inserted state. Namely, it is feasible to prevent such an accident that the optical module 60 is accidentally slipped off from the host board 40 during the operation in which signal light flows through the optical connector. In the examples of FIGS. 14A and 14B, the design of actuating member 80 can be determined depending upon environments in which the optical module 60 is used. For example, the actuating member 80 of the error-preventing type as shown in FIG. 14B is suitably applicable where the optical module is used in such environments that the optical module 60 must be prevented from being drawn during the operation, like the backbone part. Conversely, the actuating member 80 of the type as shown in FIG. 14A to permit insertion into and removal from the host board 40 even in the inserted state of the optical connector is suitably applicable to the case where it is used in such environments that switching is often carried out, for example, like switching portions.

Figure 15A:
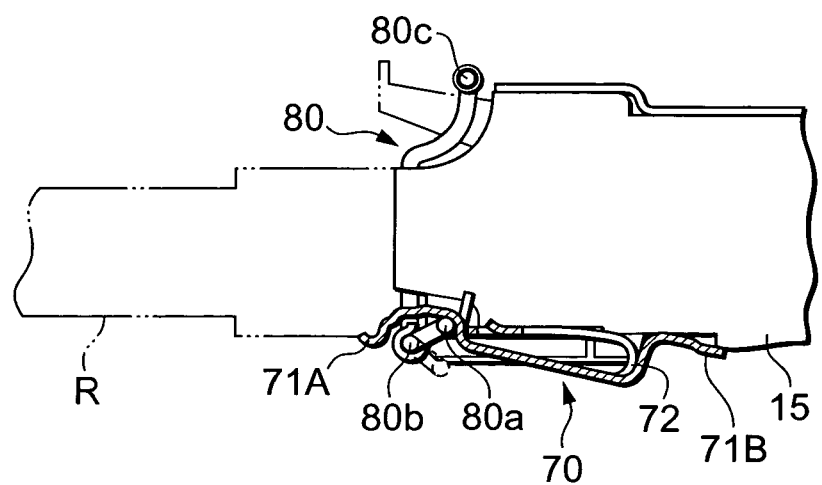
FIG. 15A is a diagram to explain the angle of rotation of the actuating member on the occasion of releasing the engagement between the projection and the hook.
Figure 15B:
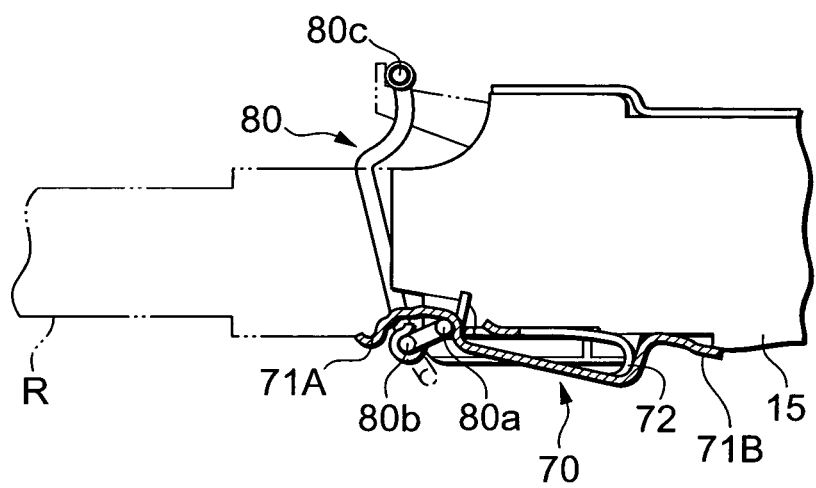
FIG. 15B is a diagram to explain the angle of rotation of the actuating member on the occasion of releasing the engagement between the projection and the hook.

Although not illustrated in FIGS. 14A and 14B, the connector occupying area R stated in the present invention also includes an optical plug for connecting the optical connector to the optical module 60. Namely, the rotation of the grip part 80*c* can be restricted by decreasing the radius of rotation of the grip part 80*c* as shown in FIG. 15A and by letting the grip part 80*c* hit the optical plug halfway of the rotation of the actuating member as shown in FIG. 15B. This arrangement can prevent the erroneous operation of dropout of the optical connector in the state in which the optical connector is inserted.

The optical module is installed on the host board by mating the projection 15 provided in the body of the optical module with the hook 41 on the host board. In the case that the hook 41 mates with the projection 15 as the lever 70 is pushed up and runs onto the hook 41, the optical model ultimately mates with the host board so far as they are manually released.

Figure 16A:
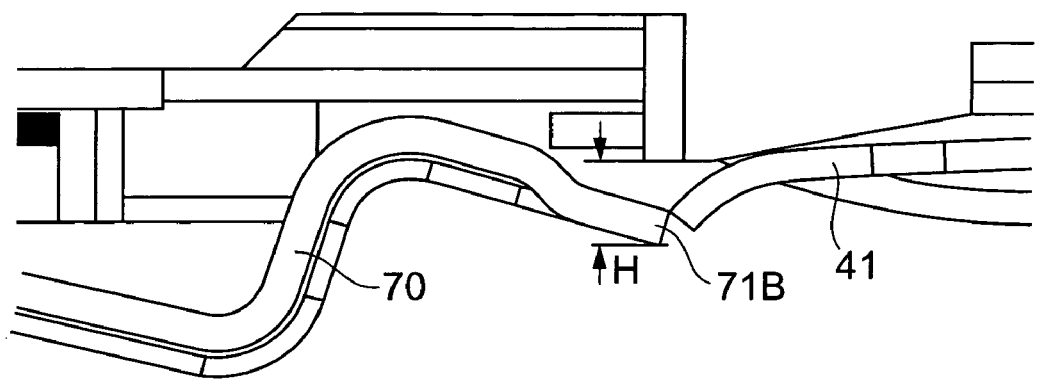
FIG. 16A shows a conventional type tip shape of the lever.

As shown in FIG. 16A, the tip of the hook is apart from the module body by about 0.5 mm at most, on the other hand they must be apart greater than 0.5 mm, at least 0.7 mm to release the mating between the hook 41 and the projection 15. Therefore, the mating the optical module with the host board can be prevented as the lever 70, in the tip of the second portion 71B thereof, is onto the hook 41 and the mating therebetween can be successfully released when the lever 70 is under the hook 41, by configuring the lever such that the tip the second portion 71B thereof is apart from at most 0.5 mm from the module body and when the lever 70 is under the hook 41, the top of the second portion 71B is at least 0.7 mm apart from the module body by rotating the actuating member 80.

Figure 16B:
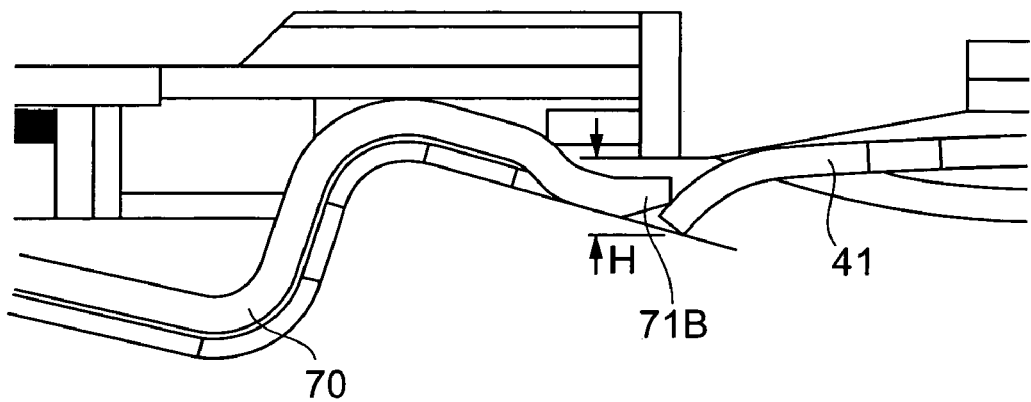
FIG. 16B shows a tip shape of the lever according to the present invention.
Figure 17A:
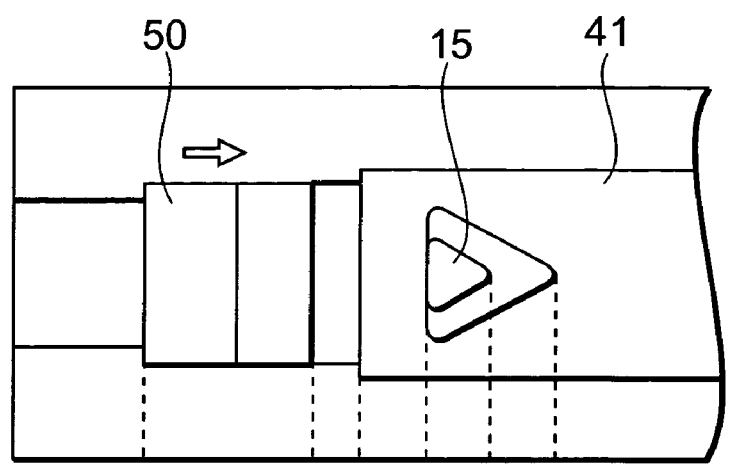
FIG. 17A is a diagram showing the conventional mechanism of releasing the engagement between the projection and the hook.
Figure 17B:
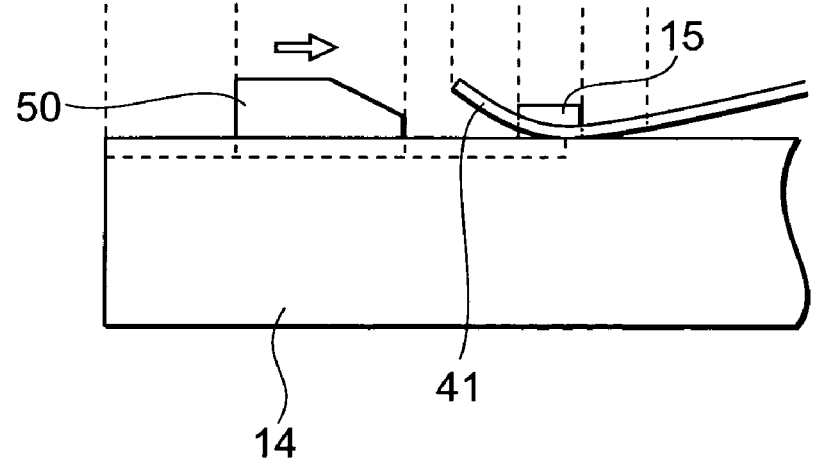
FIG. 17B is a diagram showing the conventional mechanism of releasing the engagement between the projection and the hook.

In the present invention, the tip of the second portion 71B, as shown in FIG. 16B, has such that (1) it is bent inside, (2) a outside corner thereof is chamfered, and the both shapes (1) and (2) are appeared. The lever shown in FIG. 13 is made of stainless or surface treated iron with a thickness of about 0.4 mm by cutting and bending. The configuration that the second portion 71B is once bent upward at a center thereof by 0.1 to 0.2 mm and is bend downward at the tip by 0.1 mm to 0.2 mm corresponds to the shape (1) above mentioned. The other configuration that the outside corner of the tip of the second portion 71B by 0.1 mm to 0.2 mm is chamfered corresponds to the second shape (2).

In the arrangement that the optical module has the actuating member including the sliding contact part slidingly contacting the first portion of the lever and being rotatable about the axis part adjacent to the sliding contact part and that the actuating member is rotated to move the first portion of the lever toward the module body, the hook can be readily disengaged by the actuating member and the optical module can be drawn out of the host board even in the case where optical modules are integrated in high density.

What is claimed is:

1. An optical module to be put into a host board, comprising:
    a module body to be installed on the host board;
    a projection provided on the module body and adapted to engage with a hook provided in the host board; and
    a lever mounted on the module body in order to disengage the hook engaging with the projection, to release engagement therebetween,
    wherein said lever comprises:
    a first portion which moves when a force is applied thereon in a direction toward the module body; and
    a second portion for pushing up said hook, said second portion having a tip portion and being interconnected to said first portion,
    wherein said second portion of said lever is bent toward a direction apart from said module body at a center thereof and bent toward a direction close to said module body at said tip portion thereof.

2. The optical module according to claim 1, wherein said lever further includes a curled portion connecting said first portion and said second portion, said curled portion applying a restoring force to said second portion against said first portion.

3. The optical module according to claim 2, wherein said lever is made of metal plate of stainless steal.

4. The optical module according to claim 1, wherein said module body includes,
    an optical unit having at least either a light emitting unit or a light receiving unit;
    an optical unit circuit board mounting a circuit thereon for operating said optical unit; and
    a housing for enclosing said optical unit and said optical unit circuit board therein,
    wherein said projection is provided on said housing.

5. An optical module to be put on a host board, comprising:
    a module body to be installed on said host board;
    a projection provided on said module body to be engaged with a hook provided in said host board; and
    a lever mounted on said module body to disengage said hook engaging with said projection,
    said lever including;
    a first portion for approaching said module body when a force is applied thereto a direction toward said module body, and
    a second portion for pushing up said hook, said second portion having a tip portion and being interconnected to said first portion,
    wherein said tip of said portion has a chamfered edge in a side opposite to said module body.

* * * * *